US012156306B2

(12) United States Patent
Van Bommel et al.

(10) Patent No.: US 12,156,306 B2
(45) Date of Patent: Nov. 26, 2024

(54) TUNABLE LIGHT EMITTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 125 days.

(21) Appl. No.: 17/919,276

(22) PCT Filed: Apr. 22, 2021

(86) PCT No.: PCT/EP2021/060496

§ 371 (c)(1),
(2) Date: Oct. 16, 2022

(87) PCT Pub. No.: WO2021/219479

PCT Pub. Date: Nov. 4, 2021

(65) Prior Publication Data

US 2023/0156884 A1 May 18, 2023

(30) Foreign Application Priority Data

Apr. 28, 2020 (EP) .................................... 20171706

(51) Int. Cl.
*H05B 45/20* (2020.01)
*F21K 9/232* (2016.01)
(Continued)

(52) U.S. Cl.
CPC ............ *H05B 45/20* (2020.01); *F21K 9/232* (2016.08); *F21Y 2107/90* (2016.08); *F21Y 2113/13* (2016.08); *F21Y 2115/10* (2016.08)

(58) Field of Classification Search
CPC ...... H05B 45/20; F21K 9/232; F21Y 2115/10
See application file for complete search history.

(56) References Cited

U.S. PATENT DOCUMENTS

2019/0041013 A1 2/2019 Dell

FOREIGN PATENT DOCUMENTS

WO WO-2019166273 A1 * 9/2019 ............ F21K 9/232
WO WO-2021094257 A1 * 5/2021 ............ F21K 9/232

* cited by examiner

*Primary Examiner* — Karabi Guharay

(57) ABSTRACT

A light emitting device configured to tunably emit light with a total color temperature ($CT_{tot}$), comprising: a carrier comprising a first major surface and an opposite second major surface, a first light source, arranged on said first major surface, and arranged to emit light with a first color temperature ($CT_1$) tunably adjustable within a first range from a first low to a first high color temperature, a second light source, arranged on said second major surface, and arranged to emit light with a second color temperature ($CT_2$) tunably adjustable within a second range from a second high to second low temperature, a controller configured to individually control the first and second light sources so to tunably adjust $CT_1$ and $CT_2$ from a first state to a second state according to a preselected scheme, by increasing $CT_1$ and decreasing $CT_2$ between said first and second states, such that $CT_{tot}$ remains unvaried.

13 Claims, 8 Drawing Sheets

(51) Int. Cl.

| | |
|---|---|
| ***F21Y 107/90*** | (2016.01) |
| ***F21Y 113/13*** | (2016.01) |
| *F21Y 115/10* | (2016.01) |

TUNABLE LIGHT EMITTING DEVICE

CROSS-REFERENCE TO PRIOR APPLICATIONS

This application is the U.S. National Phase application under 35 U.S.C. § 371 of International Application No. PCT/EP2021/060496, filed on Apr. 22, 2021, which claims the benefit of European Patent Application No. 20171706.3, filed on Apr. 28, 2020. These applications are hereby incorporated by reference herein.

FIELD OF THE INVENTION

This invention relates to light emitting devices with color temperature tunability.

BACKGROUND OF THE INVENTION

Lamps, luminaires, or lighting devices with controllable light sources such as light emitting diodes (LEDs) may be communicatively connected with a controller or a control unit. This may be particularly desirable for lamps capable of emitting light of different colors, such as, multicolor filament lamps, in order to facilitate or allow for adjusting the color of the light emitted by the lamp. Alternatively, or additionally, dimming of the light source(s) of the lighting device, or activation/deactivation of the light source(s), may be controlled by means of the control unit or controller transmitting control signaling to the lighting device.

Through connecting lamps, luminaires, or lighting devices with controllers new functionalities may be facilitated or enabled. The above-mentioned examples for instance may be beneficial in the field of decorative lamps or lighting, where the color or intensity of the light source can be adjusted to desire by the user.

US 2019/041013 discloses a lighting device that includes two or more independently controlled sources of light, operational within a structure having a ground surface and a ceiling surface. A first source of light emits light with predetermined correlated color temperature upward towards a portion of the ceiling directly above the lighting device, without obstruction from the lighting device. The second source of light emits light with a predetermined correlated color temperature downward, towards the floor surface. A controller independently adjusts the color temperature and intensity of the sources of light according to a time schedule.

SUMMARY OF THE INVENTION

In addition to many creative ways to use controllability of light sources in decorative lights, one new functionality may be in the field of luminaires or light engines where an "up-and-down lighting" function is desired. It is an object of the present invention to provide a light emitting device with a controllable and adjustable color temperature and luminous flux of its comprising light sources.

According to a first aspect of the invention, this and other objects are achieved by a light emitting device configured to tunably emit light with a total color temperature ($CT_{tot}$), the light emitting device comprising: a carrier comprising a first major surface and a second major surface opposite to the first major surface, a first light source, arranged on the first major surface of the carrier, and arranged to emit a first light with a first color temperature ($CT_1$), the first color temperature tunably adjustable within a first color temperature range from a first low color temperature ($CT_1^{low}$) to a first high color temperature ($CT_1^{high}$), a second light source, arranged on the second major surface of the carrier, and arranged to emit a second light with a second color temperature ($CT_2$), said second color temperature tunably adjustable within a second color temperature range from a second high color temperature ($CT_2^{high}$) to second low temperature ($CT_2^{low}$), a controller configured to individually control the first and second light sources so to tunably adjust the first and second color temperatures from a first state to a second state according to a preselected scheme, by increasing the first color temperature from $CT_1^{low}$ in the first state to $CT_1^{high}$ in the second state, and by decreasing the second color temperature from $CT_2^{high}$ in the first state to $CT_2^{low}$ in the second state, such that the total color temperature of the light emitting device remains invariant at a constant value in the first and second states.

Under total color temperature is to be understood the overall color temperature of the lighting device. This will be the average of the color temperatures of the first and second light source taking into account the luminous flux of these light sources.

It is noted that, in the context of this invention an equal color temperature may be defined as the difference between the first and second color temperatures being less than 300 K, more preferably less than 250 K, most preferably less than 200 K.

An advantage of the total color temperature remaining invariant at a constant value may be a decorative effect. More specifically, when looking directly at the light emitting device the user may differentiate between the different color temperatures of the two light sources, e.g. the first light source may emit a cooler white light, while the second light source may emit a warmer white light. At the same time, on a larger scale, looking at the total illumination of the ambient in which the light emitting device is located, the color temperature will remain the same.

According to a first main embodiment, the luminous flux of the first and second light sources are equal.

It is noted that, at an equal luminous flux of the first and second light sources, the total color temperature may for simplicity be defined as the average of the first and second color temperatures at any given state. In the context of this invention, an equal luminous flux may be defined as the difference in the luminous flux between the first and second light sources being preferably less than 50 lm, more preferably less than 45 lm, most preferably less than 40 lm.

A consequence of having equal flux is that in order to maintain the total color temperature in the second state equal to that in the first state, the color temperature change of the first and second color temperatures should be equal, regardless of their starting point in the first state ($CT_1^{low}$, and $CT_2^{high}$), or their ending point in the second state ($CT_1^{high}$, and $CT_2^{low}$). These embodiments may lead to a symmetric deco effect of the light emitting device.

In two special cases of this first embodiment, the first and second color temperatures are equal—and equal to the total color temperature—in the first or the second state. So, in other words the first and second color temperatures will start equal and then diverge, or start different and then converge, while the total color temperature is maintained.

In yet another special case of the first main embodiment, the first color temperature increases from A to B, while the second color temperature decreases from B to A. In other words: $CT_1^{low}=CT_2^{low}$, and $CT_1^{high}=CT_2^{high}$.

The equal luminous flux of the first and second light sources may stay constant during the transition between the first and second state, or it may vary slightly during the transition, depending on the desired visual effect.

According to a second main embodiment, the luminous flux of the first and second light sources are different in the first and second state. The different luminous fluxes of the first and second light sources may stay constant during the transition between the first and second state, or they may vary slightly during the transition, depending on the desired visual effect.

A consequence of this embodiment is that in the first state, the total color temperature will be closer to the light source with the higher luminous flux. In order to maintain the same total color temperature in the second state, the color temperature of the light source with the lower luminous flux needs to be changed more, i.e. the color temperature range span of that light source should be larger than that of the other light source.

According to a third main embodiment, the controller is additionally configured to individually control a first luminous flux ($F_1$) of the first light source, and a second luminous flux ($F_2$) of the second light source.

In more detail, the first light source may have a first luminous flux ($F_1^A$) at $CT_1^{low}$, and a second luminous flux ($F_1^B$) at $CT_1^{high}$, and the second light may have a first luminous flux ($F_2^A$) at $CT_2^{high}$, and a second luminous flux ($F_2^B$) at $CT_2^{low}$.

By having the possibility of control both the color temperatures and the luminous fluxes of the first and second light sources, the controller may have a variety of preselected control themes to reach the technical effect of keeping the total color temperature of the light emitting device invariant, while providing visual effects.

As an example, in the case that in the first state the first and second color temperatures are equal ($CT_1^{low}=CT_2^{high}$), the color temperature of the first and second light sources may change by different amounts, as long as the luminous flux of the first and/or second light source is altered accordingly.

If, for example, the color temperature of the first light source is increased more than the color temperature of the second light source is decreased ($|CT_1^{low}-CT_1^{high}|>|CT_2^{low}-CT_2^{high}|$), in order to compensate for the surmount of coolness light emitted from the first light source, the luminous flux of the second light source may need to be increased ($F_2^A<F_2^B$), and/or the luminous flux of the first light source decreased ($F_1^A>F_1^B$). And vice versa: if ($|CT_1^{low}-CT_1^{high}|<|CT_2^{low}-CT_2^{high}|$), then ($F_1^A<F_1^B$) and/or ($F_2^A>F_2^B$).

It is notable that, the increase or decrease of the luminous flux of the first and second light sources may be equal, or additionally the first and second luminous fluxes may be equal in the first state or second states ($F_1^A=F_2^A$, or $F_1^B=F_2^B$).

Alternatively, the difference in the luminous flux of the first light source from the first state to the second state is not equal to the difference in the luminous flux of the second light source from the first state to the second state $|F_1^A-F_1^B|\neq|F_2^A-F_2^B|$: the increase or decrease of the luminous flux of the first and second light sources may not be necessarily equal to reach the desired effect of keeping the total color temperature of the light emitting device invariant.

According to an embodiment, the light emitting device comprises: at least one light emitting diode (LED) filament, comprising an elongated carrier having a first major surface and a second major surface opposite to the first major surface, the first light source being a first plurality of LEDs mounted on the first major surface of the elongated carrier, and arranged to emit the first light with the first color temperature ($CT_1$), and the second light source being a second plurality of LEDs mounted on the second major surface of the elongated carrier, and arranged to emit the second light with the second color temperature ($CT_2$).

This embodiment may entail the advantage of a light emitting devices such as, for instance a filament lamp, tunable from a first symmetric state to a second state that the two sides may emit light with different color temperatures or colors, while maintaining the total color temperature of the light emitted by the light emitting device to the ambient unvaried.

According to an embodiment of the LED filament, the first plurality of LEDs comprises two or more subset of LEDs, each subset emitting different color points and being individually controllable by the controller, and the second plurality of LEDs comprises two or more subset of LEDs, each subset emitting different color points and being individually controllable by the controller.

According to this embodiment in order to achieve a certain white color temperature of the first light source ($CT_1$) the intensity and/or activity of the two or more subsets of LEDs with different color points may be controlled relative to each other. The like may apply mutatis mutandis to achieving a certain color temperature of light emitted from the second light source ($CT_2$).

It may be that according to an embodiment the two or more LED subsets of the first or second LED plurality comprise a first subset of LEDs arranged to emit cool white light, and a second subset of LEDs arranged to emit warm white light. In this case, the intensity and/or activity of the subsets with warm and cool white light may be controlled relative to one another in order to obtain the desired color temperature of the first or second light sources.

Additionally, or alternatively for either side of the LED filament, the LED subsets of the first or second light sources may be controlled so to achieve a certain total color point from that specific light source.

In an embodiment of the LED filament the two or more LED subsets of the first or second LED plurality comprise Red, Green, and Blue subsets, each comprising red, green and blue LEDs respectively. Consequently, the subsets may emit red, green, and blue light, respectively.

According to a second aspect, a lamp comprising the lighting emitting device, a transmissive envelope, at least partially covering the light emitting device, and a connector for electrically and mechanically connecting the lamp to a socket.

The connector may be an electrical connector, such as but not limited to a threaded Edison connector such as E26 or E27.

It is noted that the invention relates to all possible combinations of features recited in the claims.

BRIEF DESCRIPTION OF THE DRAWINGS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

Figure 1:
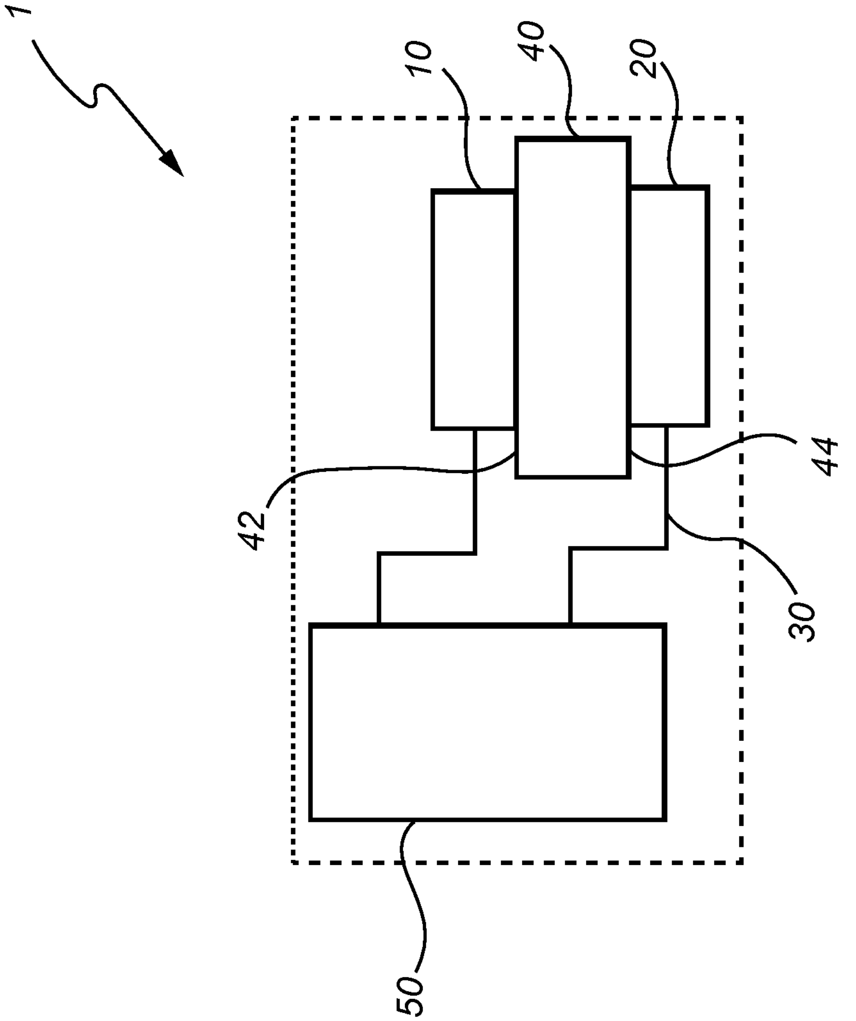
FIG. 1 demonstrates the light emitting device according to the first aspect of the invention.

FIG. 1 schematically demonstrates a light emitting device 1 according to the first aspect of the invention. The first light source 10 is arranged on a first major surface 42 of a carrier 40, and the second light emitting device 20 is arranged on a second major surface 44 of the carrier 40 opposite to the first major surface 42. The first light emitting device is arranged to emit a first light L1 substantially in a first direction $D_1$ with a first color temperature $CT_1$ tunable between a first low color temperature $CT_1^{low}$ and a first high color temperature $CT_1^{high}$, while the second light emitting device 20 is arranged to emit a second light L2 substantially in a second direction D2, opposite to the first direction k, with a second color temperature $CT_2$ tunable between a second high color temperature $CT_2^{high}$ and a second low color temperature $CT_2^{low}$. The light emitting device 1 emits a total color temperature of $CT_{tot}$. The first 10 and second 20 light sources are connected to a controller 50 through electrical connecting wires 30.

Figure 2:
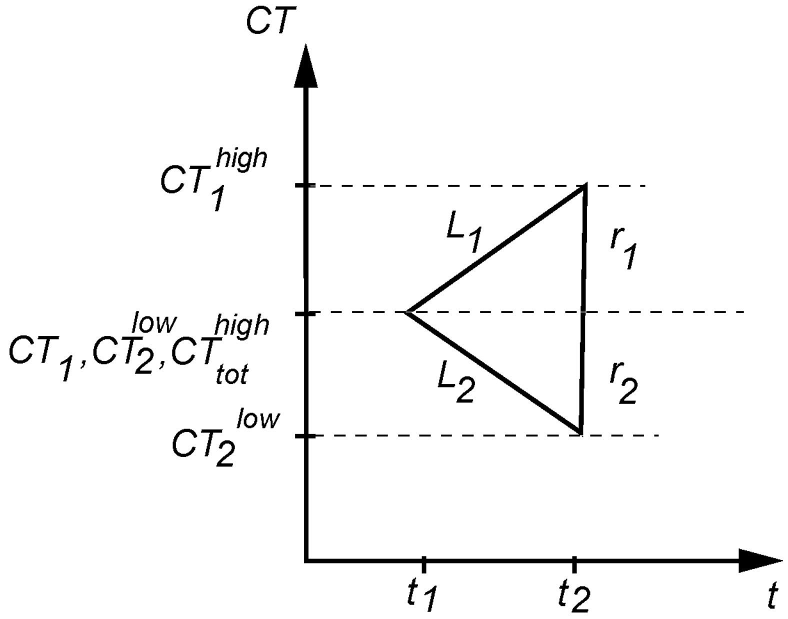
FIG. 2 demonstrates an embodiment of the preselected control scheme.

In the graph of FIG. 2 an embodiment of the preselected scheme of the controller 50 is given. The x-axis shows time t, on which the first state t1 and the second state t2 are marked, while the y-axis represents the color temperature (CT). It is noted that, in the embodiments of FIGS. 2 and 3, the luminous fluxes of the first 10 and second light source 20, $F_1$ and $F_2$ respectively, are assumed to be equal to each other and remain unvaried from the first state $t_1$ to the second state $t_2$. The controller 50 individually controls the first 10 and second light sources 20 so to tunably adjust the first and second color temperatures from a first state t1 to a second state $t_2$ according to a preselected scheme, by increasing the first color temperature from $CT_1^{low}$ in the first state $t_1$ to $CT_1^{high}$ in the second state $t_1$ (L1), and by decreasing the second color temperature from $CT_2^{high}$ in the first state $t_1$ to $CT_2^{low}$ in the second state $t_2$ (L2), such that the total color temperature of the light emitting device remains invariant at a constant value in the first and second states. As observed, the first and second color temperatures are equal, hence equal to the total color temperature in the first state $t_1$ ($CT_1^{low}=CT_2^{high}=CT_{tot}$). In order to maintain the total color temperature at $CT_{tot}$ in the second state $t_2$, the range span of the first color temperature r1 needs to be equal to the range span of the second color temperature r2. In other words: $r1=|CT_1^{low}-CT_1^{high}|=|CT_2^{low}-CT_2^{high}|=r2$.

Figure 3:
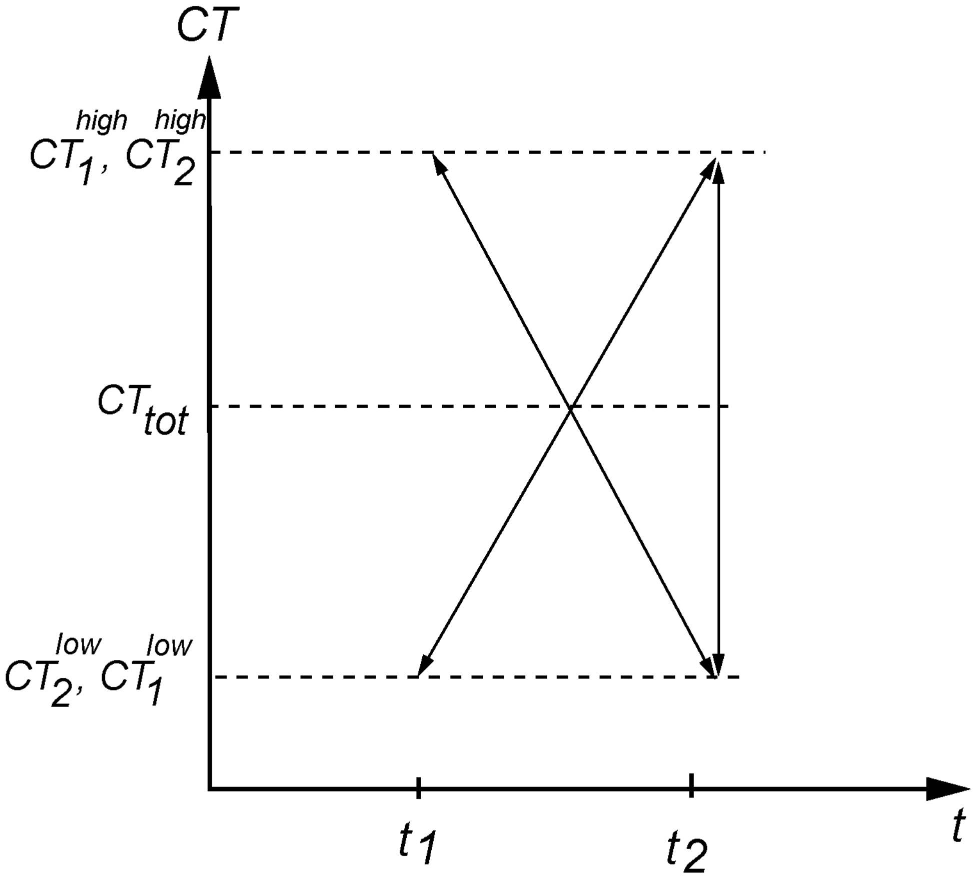
FIG. 3 demonstrates an embodiment of the preselected control scheme.

In the graph given in FIG. 3, an embodiment of the preselected control scheme is given in which the first color temperature $CT_1^{low}$ and the second color temperature $CT_2^{high}$ in the first state $t_1$ are not equal. In order for the controller 50 to be able to maintain the total color temperature of the light emitting device 1 at $CT_{tot}$ is the second state t2, it is required that the decreasing L1 of the first color temperature and the increasing L2 of the second color temperature be carried out such that the first color temperature in the second state t2 is equal to the second color temperature in the first state ($CT_1^{high}=CT_2^{high}$), and the second color temperature in the second state t2 is equal to the first color temperature in the first state t1 ($CT_2^{low}=CT_1^{low}$). Consequently, the range span of the first and second color temperatures will be equal r1=r2.

In the following embodiments of the preselected control scheme (FIGS. 4, and 5) the luminous fluxes of the first 10 and the second light sources 20 in the first state t1 ($F_1^A$, and $F_2^A$ respectively) are not equal to those luminous fluxes in the second state t2 ($F_1^B$, and $F_2^B$ respectively): $F_1^A \neq F_1^B$, and $F_2^A \neq F_2^B$. It is also notable that while the left-hand side y-axis continues to represent the color temperature CT, the right-hand side y-axis shows the luminous flux F.

Figure 4:
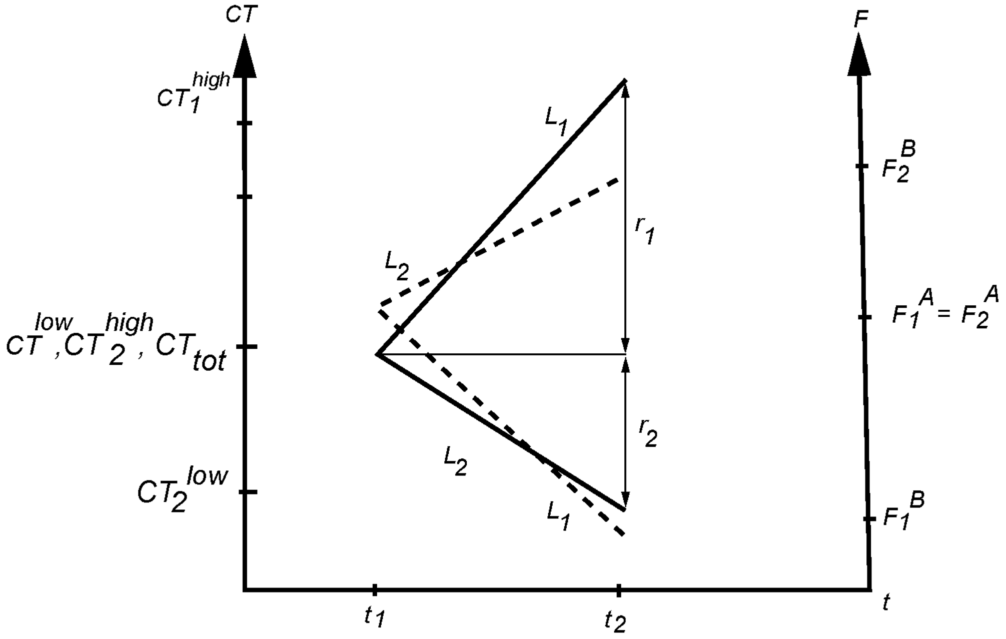
FIG. 4 demonstrates an embodiment of the preselected control scheme.

In the embodiment of FIG. 4, the first and second color temperatures in the first state t1 are equal, and equal to the total color temperature of the light emitting device 1: $CT_1^{low}=CT_2^{high}=CT_{tot}$. The luminous flux of the first 10 and second 20 light sources are equal at the first state t1: $F_1^A=F_2^A$. The controller 50 tunes the first color temperature along L1 with a range span of r1, and the second color temperature along L2 with a range span of r2 such that the range spans of the two color temperatures are not equal, with the first range span being larger than the second range span: $r1=|CT_1^{low}-CT_1^{high}|>|CT_2^{low}-CT_2^{high}|=r2$.

In such embodiments of the preselected control scheme where the tunability range spans of the first and second light sources 10, and 20 are not equal, in order to maintain the total color temperature of the light emitting device 1 at $CT_{tot}$ in the second state t2, the luminous fluxes of the first and second light sources 10, and 20 need to be changed in corresponding opposite directions. In the embodiment of FIG. 4, this translates to a reduction of the luminous flux of the first light source 10, and an increase in the luminous flux of the second light source 20. The changes in the luminous fluxes of the first and second light sources 10, and 20 are depicted with dashed lines L1', and L2' respectively. From this graph it is observed that $F_1^A>F_1^B$, and $F_2^A<F_2^B$. In simpler words, whichever light source has the more drastic change in color temperature (the first light source 10 in this embodiment), will have a decrease in its luminous flux from the first state t1 to the second state t2. The other light source with the less drastic change in its color temperature (the second light source 20 in this embodiment), may maintain its luminous flux as the same as the first state t1 in the second state t2 ($F_2^A=F_2^B$), or as in the case of the embodiment of FIG. 4, may have an increase in its luminous flux.

Figure 5:
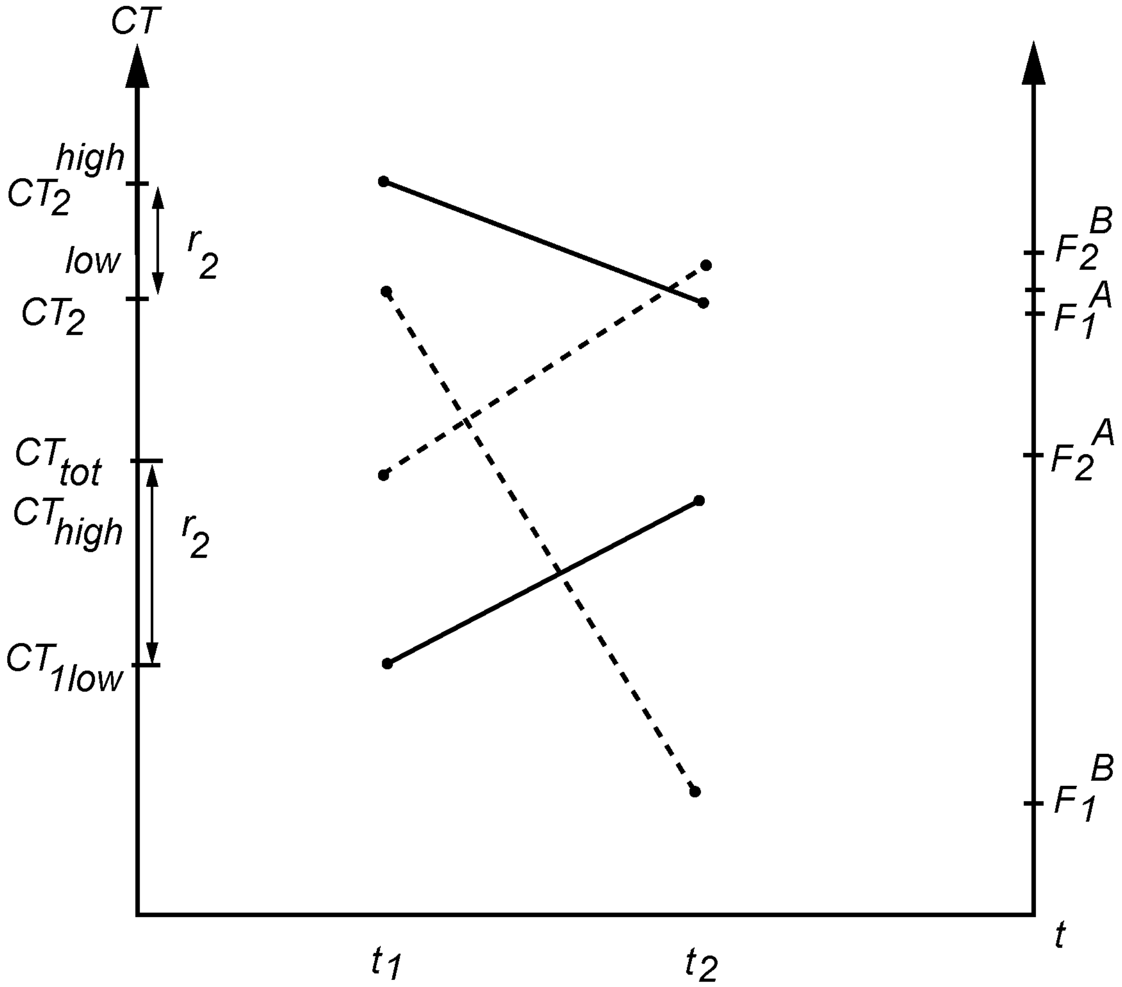
FIG. 5 demonstrates an embodiment of the preselected control scheme.

In the embodiment of FIG. 5, the first and second color temperatures are not equal in the first state t1 ($CT_1^{low} \neq CT_2^{high}$). Additionally, the luminous fluxes of the first and second light sources 10, and 20 in the first state t1 are not equal: $F_1^A \neq F_2^A$. Note that the total color temperature $CT_{tot}$ of the light emitting device 1 will be a value corresponding to the intensity of the luminous fluxes coming from each of the different color temperatures. In order for the controller to maintain the same total color temperature $CT_{tot}$ in the second state t2, the luminous fluxes of the first and second light sources 10, and 20 need to be adjusted according to the changes in the first and second color temperatures.

Figure 6:
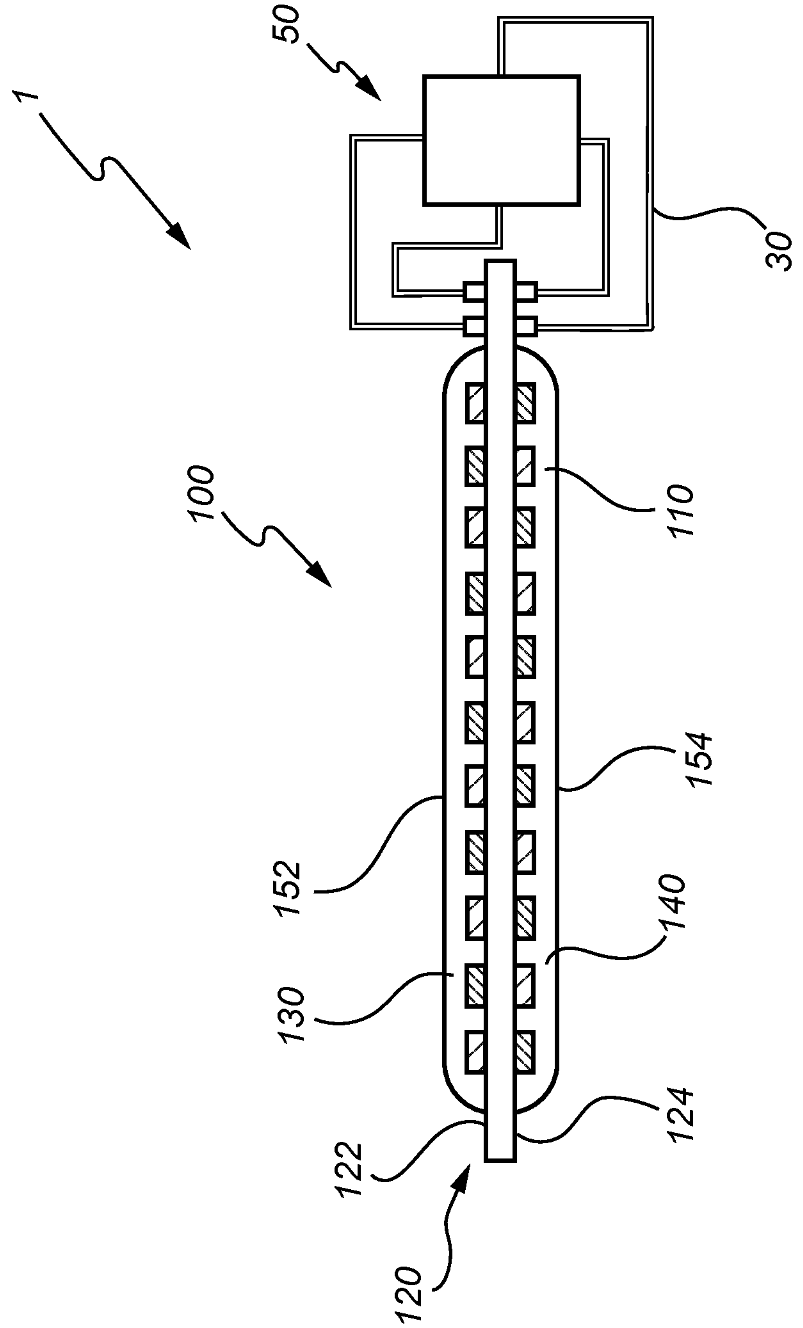
FIG. 6 demonstrates an embodiment of the light emitting device.

FIG. 6 shows a LED filament 100 embodiment of the light emitting device 1. In the context of this invention, the LED filaments 100 of the lighting emitting device 1 can be described as follows. A first plurality of LEDs 110 is arranged on a first major surface 122 of an elongated carrier 120. Please note that in this text the terms "carrier" and "substrate" may be used interchangeably, and unless stated otherwise, are meant to imply the same meaning. The LEDs 110 are covered by an encapsulant 152 which at least partially covers the first major surface 122 of the elongated carrier 120 as well. These LEDs 110 together with their encapsulant 152 correspond to the first light source 130 of the light emitting device 1. On a second major surface 124 of the elongated carrier 120 opposite to the first major surface 122, a second plurality of LEDs 110 is arranged, covered by an encapsulant 154. These LEDs 110 together with their encapsulant 154 correspond to the second light source 140 of the light emitting device 1. The first and second light sources 130, and 140 are connected to a controller 50 through electric connectors 30. The controller tunes the first and second color temperatures of the first and second light sources 130, and 140, individually from a first low color temperature in the first state t1 to a first high color temperature in the second state t2, and a second high color temperature in the first state t1 to a second low color temperature in the second state t2, respectively.

Preferably, the LED filament 100 has a length G and a width W, wherein G>5W. The LED filament 100 may be arranged in a straight configuration similar to FIG. 6, or in a non-straight configuration such as for example a curved configuration, a 2D/3D spiral or a helix.

The linear array in which the LEDs 110 are arranged, may be in the longitudinal direction of the elongated carrier 120. The linear array is preferably a matrix of N×M LEDs 110, wherein N=1 (or 2) and M is at least 10, more preferably at least 15, most preferably at least 20 such as for example at least 30 or 36 LEDs 110.

The carrier 120 may be rigid (made from e.g. a polymer, glass, quartz, metal or sapphire) or flexible (e.g. made of a polymer e.g. a film or foil).

A carrier of rigid material may provide better cooling of the LED filament 100, meaning the heat generated by the LED 110 may be distributed by the rigid substrate A carrier 120 of flexible material may provide shape freedom for designing the aesthetics of the LED filament 100 due to flexibility.

It should be noted that, the thermal management of thin, flexible material may typically be poorer compared to rigid material. However, on the other hand, having rigid material as the substrate 120, may limit the shape design of the LED filament 100.

The carrier 120 may be light reflective. In this embodiment light emitted by the LEDs 110 is reflected off the surface 122, 124 of the substrate 120 on which the LEDs 110 are arranged on, thus hindering light from propagating the filament substrate 120.

Further, the LEDs 110 may be arranged for emitting LED light e.g. of different colors or spectrums. The encapsulants 152, 154 may comprise a luminescent material that is configured to at least partly convert LED light into converted white light. The luminescent material may be a phosphor such as an inorganic phosphor, blue and/or green-yellow and/or orange-red phosphor, and/or quantum dots or rods.

Additionally, or alternatively, the encapsulants 152, 154 may comprise light scattering material.

Each of the LEDs 110 of the LED filament 100 may emit white light. The LEDs may emit cool white or warm white light. The LEDs may be blue or UV LEDs covered by an encapsulant 152, 154, such that the encapsulant 152, 154 includes luminescent material, such as phosphor particles. The luminescent material will provide a wavelength conversion of the light from the LEDs 110, and the light emitted from this section will be white light consisting of a mix of blue/UV light and wavelength converted light. The white light may have a color temperature on the black body line.

Additionally, or alternatively, the LED filament 100 may comprise red (R), and blue (B) LEDs covered by an encapsulant 152, 154, such that the encapsulant 152, 154 comprises luminescent material.

Alternatively, or simultaneously, the LED filament 100 may comprise groups of red (R), green (G), and blue (B) LEDs 110, wherein light emitted from each of the RGB LEDs 110 are combined to produce white light with a cool or warm color temperature. The red, green, and blue LEDs 110 in each group can be arranged as groups, or disposed one after the other in the longitudinal direction of the LED filament 100.

The white light will have an adjustable color temperature. This may be achieved by including at least two different types of LEDs 110, e.g. red and blue LEDs. By controlling the relative intensity of each type of LED 110, the color temperature of the emitted light can be controlled.

Additionally, or alternatively the light emitted by the LED filament 100 may be tunable to any color of the spectrum. This may be achieved by individually controlling the activity and/or intensity of each of the RGB LEDs 110.

In addition to solely changing the total color temperatures, and/or luminous fluxes of the first and second light sources 10, 130, and 20, 140 of the light emitting device 1, another method for maintaining the total color temperature constant from the first state t1 to the second state t2, is to tamper with the color of the emitted light from the light sources.

According to the alternatives of this embodiment, light emitted by the first and second light sources 10, 130, and 20, 140 in the first state t1, and/or second state t2 may not be different temperatures of white light, but light with a color other than white, for instance, but not limited to red, or green. In that case, it may be that the sum of the non-white light emissions of the first and second light sources 10, 130, and 20, 140 falls onto the black body locus. This may entail that even though light emitted from each of the light sources may be different colors, the total light emitted from the light emitting device may have a white color with a certain color temperature 1 defined by the color temperature of the light emitting device 1 in the first state t1.

Figure 7:
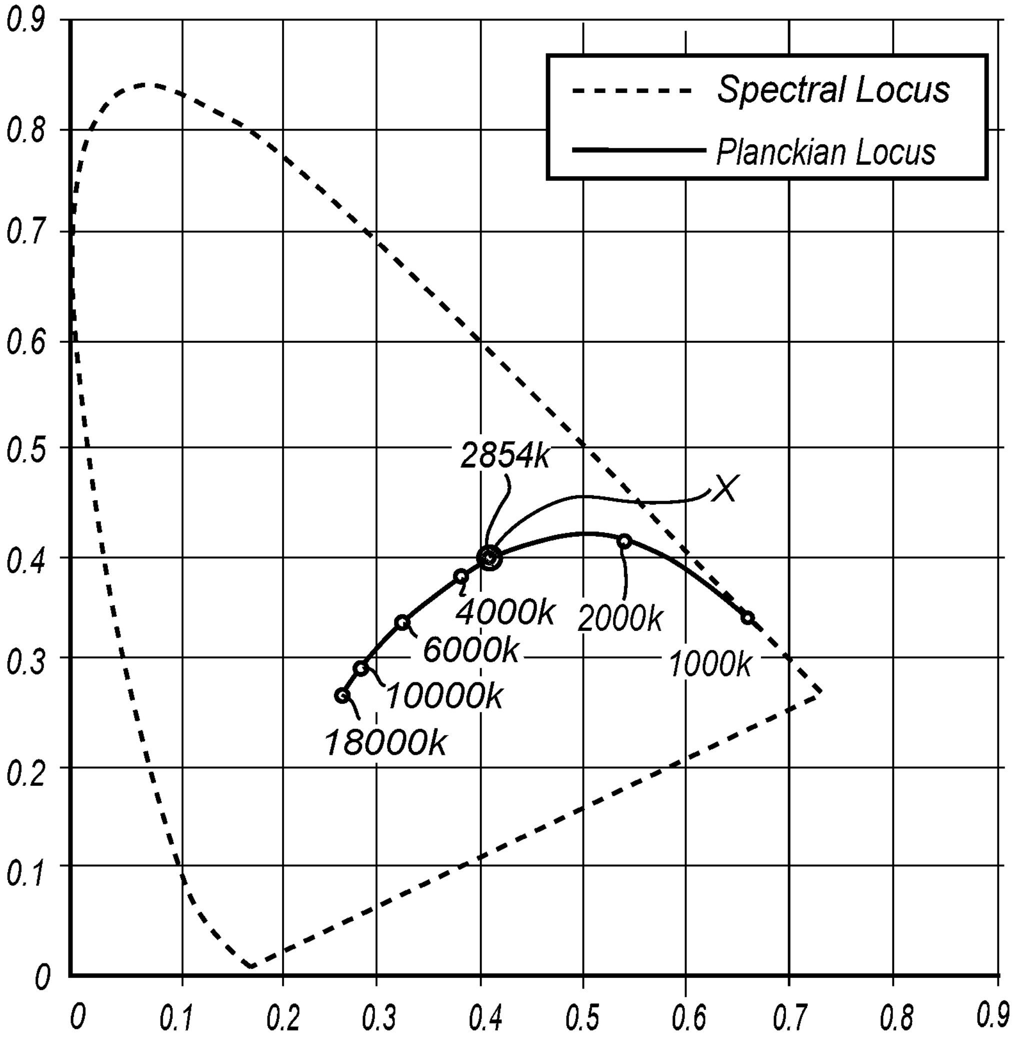
FIG. 7 demonstrates the light temperature/spectrum of the light emitting device in the first state on the chromaticity diagram.
Figure 8:
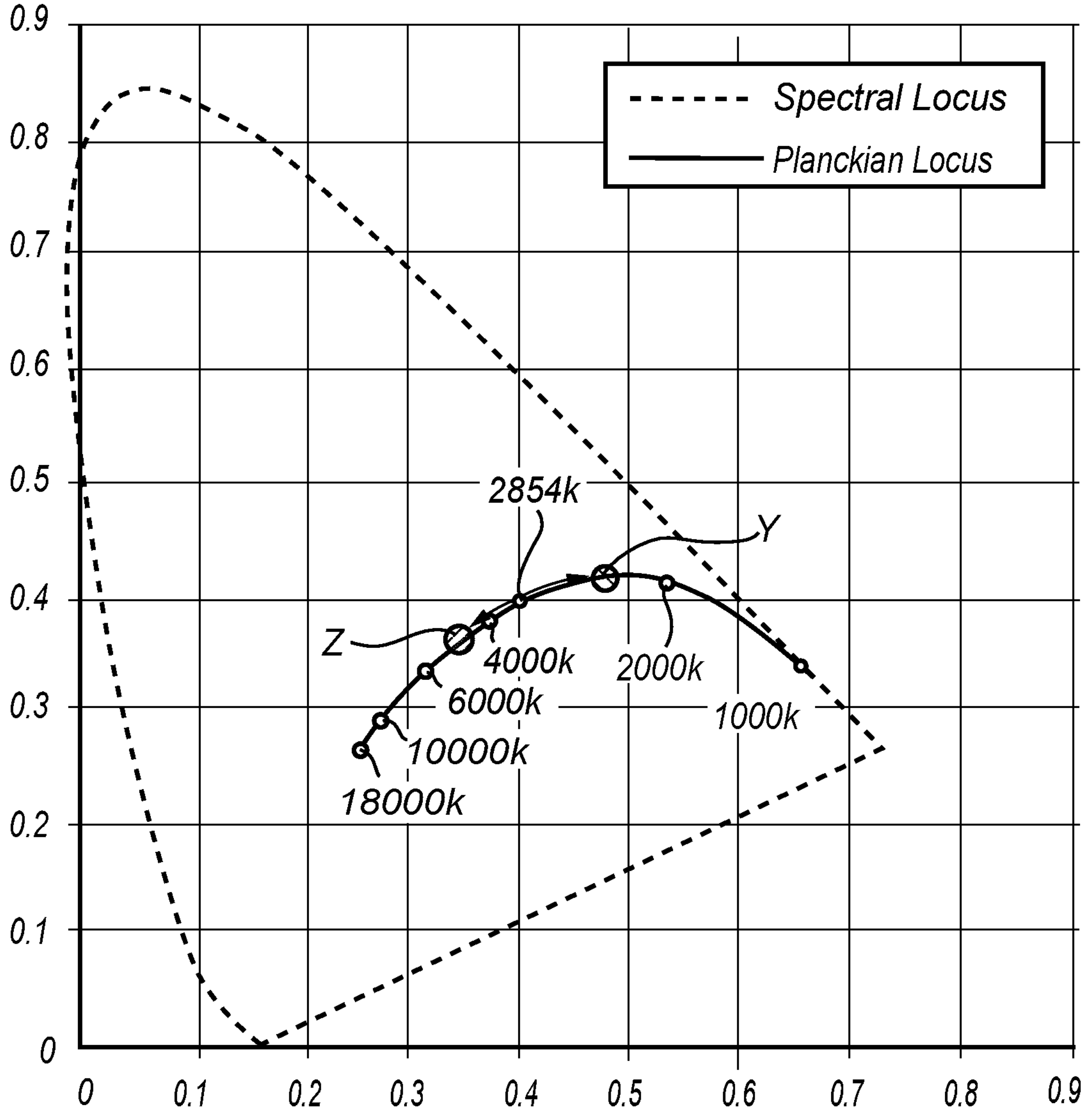
FIG. 8 demonstrates the light temperature/spectrum of the light emitting device in the second state on the chromaticity diagram.
Figure 9:
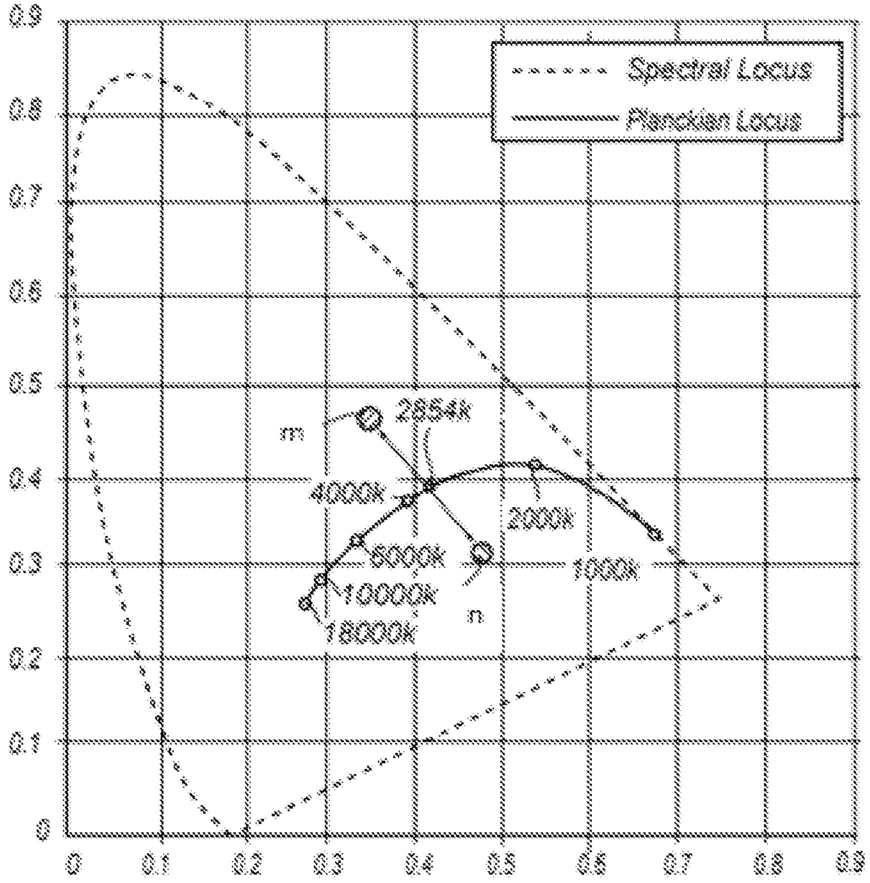
FIG. 9 demonstrates the light temperature/spectrum of the light emitting device in the second state on the chromaticity diagram.

FIGS. 7 through 9 demonstrate the Chromaticity diagram on which the black body locus is depicted by the full line, while the spectral locus is depicted by the dashed line. The total color temperature $CT_{tot}$ of the light emitting device 1 will be on the black body locus depending on how warm or cool the total white light emitted from the light emitting device 1 is, and is shown by point X.

FIG. 7 demonstrates the light temperature/spectrum of the light emitting device 1 according to an embodiment in the first state t1. According to this specific embodiment the total color temperature is somewhere around 3500 K. According to this plot, it can be understood that the first and second color temperatures also fall onto point X in the first state.

FIG. 8 demonstrates the temperature/spectrum of the light emitting device 1 in the second state t2. It is observable that, the first color temperature is increased from point X to point Z along the black body locus, so that point z stays on the black body locus. This means that the light emitted from the first light source 10, 130 remains white, and is only a cooler temperature in the second state t2. Similarly, the second color temperature is decreased from point X to point Y along the black body locus, so that point y also stays on the black body locus. This means that the light emitted from the second light source 20, 140 remains white, and is only a warmer temperature in the second state t2. The total color temperature is marked with an X, and as observable remains at the same point as in FIG. 7 (the first state t1).

FIG. 9 demonstrates the light temperature/spectrum of the light emitting device 1 in the second state t2 according to another embodiment of the preselected control scheme of the controller 50. In this embodiment, the light of the first light source 10, 130 is tuned away from the black body locus, and towards a green-like color in the spectrum. The spectrum of the first light emitting device 10, 130 is shown as point m. Likewise, the spectrum of the second light source 20, 140 is tuned away from the black body locus, and towards a red-like color. This is marked by point n. Note that, in order to maintain the total color temperature of the light emitting device 1 at $CT_{tot}$ (point X) in the second state t2, the color tuning of the first and second light sources 10, 130, and 20, 140 needs to be carried out in opposite directions within the spectral locus.

The person skilled in the art realizes that the present invention by no means is limited to the preferred embodiments described above. On the contrary, many modifications and variations are possible within the scope of the appended claims. For example, an embodiment where the preselected scheme is such that the first and second luminous fluxes are increased or decreased not along a linear path as demonstrated in all the embodiments in the description, but along a sinusoidal function with a constant amplitude, or alternatively varying amplitude.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device configured to tunably emit light with a total color temperature ($CT_{tot}$), said light emitting device comprising:

at least one light emitting diode (LED) filament, comprising an elongated carrier having a first major surface and a second major surface opposite to said first major surface, a first light source, being a first plurality of LEDs arranged on said first major surface of the carrier, and arranged to emit a first light with a first color temperature ($CT_1$), said first color temperature tunably adjustable within a first color temperature range from a first low color temperature ($CT_1^{low}$) to a first high color temperature ($CT_1^{high}$), having a range span r1=$|CT_1^{low}-CT_1^{high}|$, and with a first luminous flux $F_1$, a second light source, being a second plurality of LEDs arranged on said second major surface of the carrier, and arranged to emit a second light with a second color temperature ($CT_2$), said second color temperature tunably adjustable within a second color temperature range from a second high color temperature ($CT_2^{high}$) to second low color temperature ($CT_2^{low}$), having a range span r2=$|CT_2^{low}-CT_2^{high}|$, and with a second luminous flux $F_2$, a controller configured to individually control the first and second light sources so to tunably adjust said first and second color temperatures from a first state to a second state according to a preselected scheme, by increasing the first color temperature from $CT_1^{low}$ in said first state to $CT_1^{high}$ in said second state, and by decreasing the second color temperature from $CT_2^{high}$ in said first state to $CT_2^{low}$ in said second state, said controller is further configured to control the first and second luminous fluxes $F_1$ and $F_2$, such that the change is $F_1$ is larger than the change in $F_2$ if r1<r2 and visa versa, such that the total color temperature of the light emitting device remains invariant at a constant value in said first and second states, the first color temperature and the second color temperature differ less than 300 K.

2. The light emitting device according to claim 1, wherein the luminous flux of the first and second light sources is equal in the first and second states.

3. The light emitting device according to claim 2, wherein the luminous flux of the first and second light sources remains constant during a transition from the first state to the second state.

4. The light emitting device according to claim 3, wherein said first color temperature and second color temperature are equal in said first state or in said second state.

5. The light emitting device according to claim 3, wherein the first color temperature in the first state is equal to the second color temperature in the second state, and the second color temperature in the first state is equal to the first color temperature in the second state.

6. The light emitting device according to claim 1, wherein the luminous flux of the first and second light sources are different in the first and second states.

7. The light emitting device according to claim 6, wherein the luminous fluxes of the first and second light sources remain constant during a transition from the first state to the second state.

8. The light emitting device according to claim 1, wherein a difference in luminous flux of the first light source from the first state to the second state is different from a difference in luminous flux of the second light source from the first state to the second state.

9. The light emitting device according to claim 1, wherein a change in said first color temperature is different than a change in said second color temperature ($|CT_1^{low}-CT_1^{high}| \neq |CT_2^{low}-CT_2^{high}|$).

10. The light emitting device according to claim 1, wherein said first plurality of LEDs comprises two or more subset of LEDs, each subset emitting different color points and being individually controllable by said controller, and said second plurality of LEDs comprises two or more subset of LEDs, each subset emitting different color points and being individually controllable by said controller.

11. The light emitting device according to claim 10, wherein said two or more LED subsets of the first or second plurality of LEDs comprise a first subset of LEDs arranged to emit white light with a first color temperature, and a second subset of LEDs arranged to emit white light with a second color temperature, wherein the first color temperature is higher than the second color temperature.

12. The light emitting device according to claim 10 wherein said two or more LED subsets of the first or second LED plurality comprise Red, Green, and Blue subsets, each comprising red, green and blue LEDs respectively.

13. A lamp comprising said lighting emitting device according to claim 1, a transmissive envelope, at least partially covering said light emitting device, and a connector for electrically and mechanically connecting said lamp to a socket.

* * * * *